March 1, 1966     T. A. BRANDON, JR     3,237,994
TRACTOR-TRAILER BRAKE SYSTEM
Filed Oct. 28, 1963     3 Sheets-Sheet 3

INVENTOR.
THOMAS A. BRANDON JR.
BY
ATTORNEY

United States Patent Office 3,237,994
Patented Mar. 1, 1966

3,237,994
TRACTOR-TRAILER BRAKE SYSTEM
Thomas A. Brandon, Jr., South Bend, Ind., assignor to The Bendix Corporation, South Bend, Ind., a corporation of Delaware
Filed Oct. 28, 1963, Ser. No. 319,134
3 Claims. (Cl. 303—7)

This invention relates to a hydraulic brake system for a tractor-trailer vehicle wherein the tractor mounts both the primary or tractor brake system and a secondary or trailer brake power boost unit.

As may be readily appreciated by those skilled in the art to which my invention relates, a more common tractor-trailer system of today employs a hydraulic braking system for a tractor and air braking, or vacuum, operated servo-motor braking system for the trailer. Some of these systems have numerous problems, one of which, in particular to the air brake system, lies in the condensation of water vapor necessitating the use of drying agents and the like to prevent freeze-up during cold weather operations.

I have also found that my invention has advantages over electric trailer brakes in that it is less expensive, has better performance and fewer working parts.

In addition, certain of the systems aforedescribed have complex construction features for the tractor and/or trailer manufacturer. It is therefore my intent to provide a tractor-trailer braking system which eliminates the aforementioned problems.

More particularly, it is a principal object of my invention to provide a braking system for a tractor-trailer type of vehicle wherein the tractor portion of same will mount the brake boosting apparatus for the trailer portion of the vehicle whereby one must only hook up one line upon connection of the trailer with the tractor.

It is also an object of my invention to provide a trailer brake power boost unit on the tractor portion of a tractor-trailer type vehicle with a means to readily connect the hydraulic line between the tractor and the trailer and bleed air from the trailer system easily.

A further object of this invention is to provide a trailer boost unit that may be used as a control valve to modulate a control vacuum to a straight vacuum trailer when a tractor pulling same is not equipped with another device to accomplish this function.

A still further object of my invention is to provide a tractor-trailer braking system having an operator controlled actuation device for both the tractor and trailer portions of the vehicle simultaneously, as well as an individual trailer brake actuating valve.

Other and further objects of my invention will appear from the following description of the accompanying drawings in which.

Figure 3:
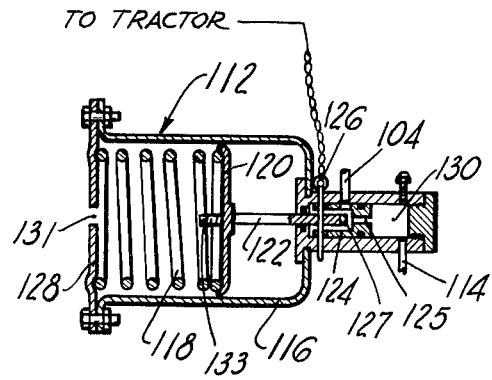
Figure 4:
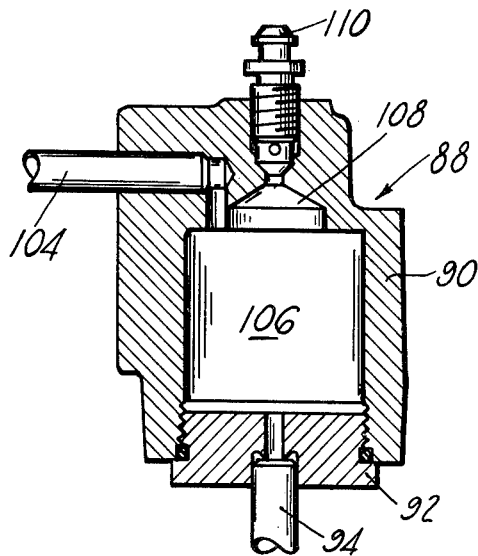

FIGURE 3 is a cross sectional view of an automatic pressurizing device actuatable upon the break-away of the trailer portion from the tractor portion of a vehicle, which break-away device is constructed in accordance with the teachings of my invention; and FIGURE 4 is a cross sectional view of a reservoir for the trailer portion of the tractor-trailer vehicle allowing the bleeding of air within the braking system readily.

Figure 1:
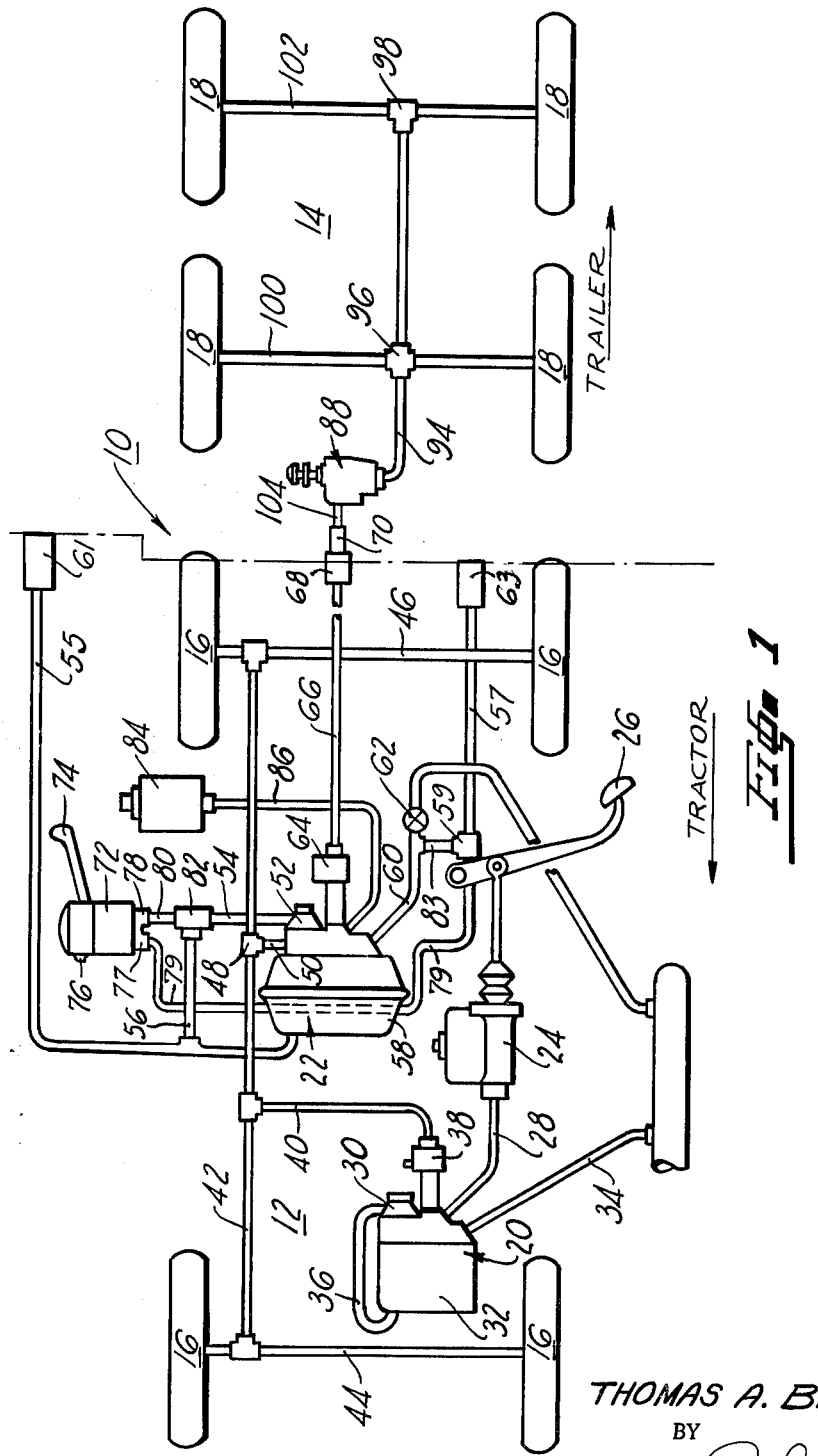
FIGURE 1 is a schematic plan view of a tractor-trailer brake system constructed in accordance with a preferred embodiment of my invention.

With more particular reference to FIGURE 1, I show a vehicle 10 having a tractor portion 12 and a trailer portion 14 provided with wheels 16 and 18, respectively, having brake apparatus therewithin.

In the tractor portion 12 I have mounted primary and secondary power units 20 and 22, respectively, for actuation of said wheel cylinders of the wheels 16 and 18, respectively. To activate these units I have mounted a master cylinder 24 that is controlled by a brake pedal 26 to provide a fluid pressure via conduit 28 to the primary power unit 20 to activate a control valve 30 therein and thereby create a differential pressure in the motor chamber 32 thereof. As may be readily appreciated by those skilled in the art, the motor chamber may be constructed to be essentially a closed cylinder having a movable wall therein which, as shown, is supplied on one side thereof as by a conduit 34 with an engine intake vacuum, which vacuum is also routed through the control valve 30 and the conduit 36 to the other side of the power cylinder to provide a vacuum suspended power unit. Thus, it may be readily understood that as the operator actuates the master cylinder 24, as by the brake pedal 26, he will create a pressure in the conduit 28 that will actuate the valve 30 to destroy the vacuum suspension of the power cylinder 32 and allow atmospheric pressure to enter in conduit 36 to move the movable wall to pressurize slave cylinder 38 having a piston therewithin operatively connected to the movable wall of the power cylinder 32. The pressure created within the slave cylinder 38 is then directed by way of conduit 40 to the supply lines 42, 44 and 46 of the tractor portion of the vehicle 10. This will expand the wheel cylinders of the drum brakes within the wheels 16, as may be readily understood, to decelerate the vehicle.

This tractor deceleration, however, is not sufficient to bring the vehicle 10 to a stop. Therefore, I have provided a secondary power unit 22 on the tractor portion 12 which receives a control pressure from the line 42 by way of the T-connection 48 and conduit 50 that routes the pressure within the line 42 to the secondary power unit control valve 52 to create a control pressure within the conduits 54 and 56 leading to the rear side of a power chamber 58 of the secondary power unit 22, which power chamber contains the familiar movable wall and is arranged to receive a subatmospheric pressure in front of the movable wall as by the supply conduit 60 which is connected to the engine intake manifold as the conduit 34 of the primary control unit 20 was connected. One point of interest at this time, however, should be noted, and that is that the supply conduit 60 is provided with an off-on type of valve 62 so that the secondary power unit may be deenergized when it is not needed, as when the tractor is operating alone. As with the primary power unit 20, the secondary power unit 22 contains a slave cylinder 64 having a piston therewithin operatively connected to the movable wall of the power chamber 58 so that when an atmospheric pressure translates the movable wall a pressure is delivered to a conduit 66 connected with the slave cylinder 64. The slave cylinder 64 differs from cylinder 38 in that there is no provision for hydraulic fluid to flow from line 50 through cylinder 64 and out to the trailer brakes. Thus, I have a separate hydraulic system independent of the tractor brake system so that a trailer failure does not bleed the tractor brakes. The conduit 66 terminates in a disconnect type coupling that is familiar within the art and comprises a female portion 68 and a male portion 70, which when mated allow fluid communication therethrough, and which when disconnected prevent fluid communication or leakage from the conduit 66. The quick disconnect allows the joining and uncoupling of the trailer portion 14 with the tractor portion 12; it being understood that one of the portions of the vehicle contains one of the elements of the coupling and the other portion of the vehicle contains the other portion of the coupling.

In order to provide universal features so that a tractor equipped with my power system may be adapted to several trailer types, I have provided a branch conduit 55 off the control conduit 56 and another branch conduit 57 connected by a T-fitting 59 to a vacuum supply conduit, which conduits terminate in quick disconnects 61 and 63. This will allow any tractor equipped with my system to operate a vacuum trailer brake system.

In addition, I have provided a control valve 72 having a hand-operated lever 74 for communicating an atmospheric port 76 with a control port 78 that is connected by a conduit 80 and a shuttle valve 82 having provisions to close off conduit 54 when valve 52 is not scheduling control pressure with the conduits 54 and 56. In order to release the brakes after an application by valve 72, I have connected a port 77 with a conduit 79 that is joined to the T-fitting 59 connected by a conduit 83 to conduit 60. Thus, the secondary power unit 22 may be controlled by either the pressure from the primary control unit 20 or the hand control valve 74, as is desired by the operator of the vehicle 10. Furthermore, in that the trailer portion 14 is a separate hydraulic portion 12, I have provided a reservoir 84 connected by a conduit 86 to the slave cylinder 64. This will allow compensation of any fluid loss which may occur or as by connecting or small leakages in the trailer portion.

With reference again to the trailer braking system, I have also provided a reservoir 88 shown in more detail in FIGURE 4 as having a housing 90 closed on the bottom by a fitting 92 adapted to mount a conduit 94 leading to the distribution network of fittings 96 and 98 and conduits 100 and 102 supplying the wheel cylinders of drum brakes within wheels 18 of the trailer portion 14. The reservoir 88 is fed by a conduit 104, and is arranged such that a vertical column of fluid is held within a chamber 106 therewithin, so that any air entrapped within the trailer portion brake system may rise through this vertical column to a chamber 108 and be bled as by the familiar bleed means 110 at the top of the chamber 108. The reservoir is to compensate for fluid loss which may occur during coupling and uncoupling or, while the trailer is standing uncoupled, compensate for fluid losses due to leakages, evaporation or temperature changes in addition to allowing easy removal of air when these losses occur and fluid is displaced with air.

As a safety feature an automatic trailer brake applying means 112 (seen in FIGURE 3) may be connected with line 104, as shown, between the male element 70 and the reservoir 88 with a conduit 114 leading to the reservoir 88 as formerly had the conduit 104. This automatic brake applying means is simply constructed as a housing 116 that is during normal uncoupling a part of the tractor, but upon joining of tractor and trailer the housing is connected to the trailer. Within the housing a spring 118 is arranged to bias a plate 120 that is connected to a push-rod 122 connected to a piston 124 held by a retaining or safety pin 126 to compress the spring 118 against an end wall 128 of the chamber 116. The piston 124 has internal passages 125 controlled by a resilient plug 127 on the end of rod 122. The piston 124 is normally positioned, as shown in FIGURE 3, immediately behind the inlet of conduit 104 into a variable chamber 130 that is exhausted by the conduit 114. The safety pin 126 is always connected by a chain, rope, cable, etc., to the tractor portion of the vehicle so that upon a break-away of the trailer portion 14 from the tractor 12 safety pin 126 will be removed and the spring 118 will actuate rod 122 to first close passage 125 and then move piston 124 to pressurize the fluid within the variable volume chamber 130 that is delivered by way of conduit 114 to the trailer braking system aforementioned. Thus, the brakes are applied automatically upon emergency situation such as a break-away aforementioned. As seen, the housing end wall 128 is drilled, as at 131, so that a tubular internally threaded device (not shown) can be threaded onto a projection 133 of rod 122 to reset the piston 124.

Figure 2:
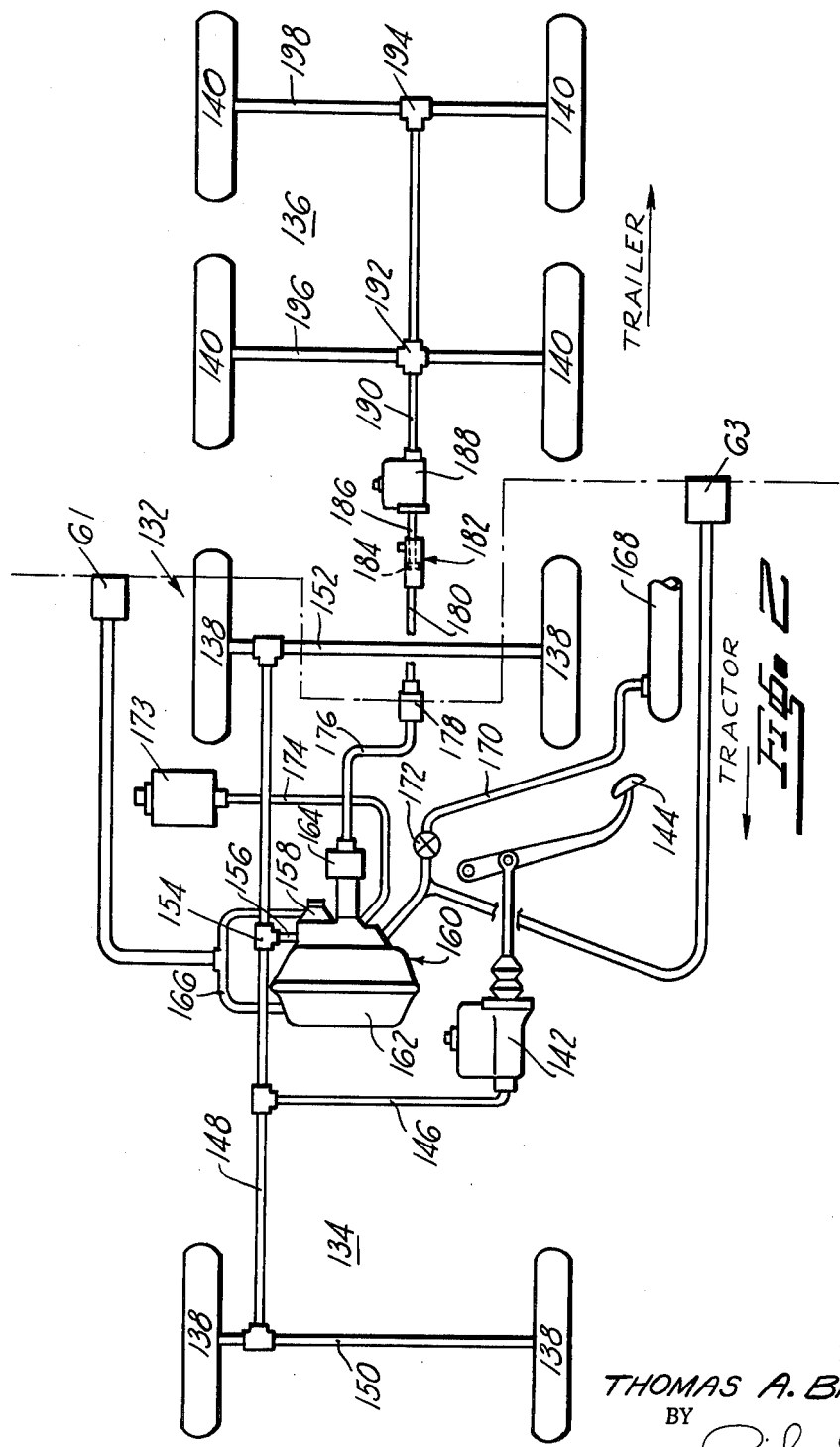
FIGURE 2 is a plan view of a tractor-trailer braking system constructed in accordance with a modification to the preferred embodiment of my invention.

With reference now to the embodiment of my invention shown by FIGURE 2, it is to be understood that such a modification is desirable for lighter weight vehicles and/or tractor-trailer combinations whereby it is desirable to have a completely closed trailer braking system. In more detail, I show a vehicle 132 having a tractor portion 134 and a trailer portion 136 with the tractor wheels 138 and the trailer wheels 140 being provided with braking means similar to that provided in the tractor-trailer vehicle 10.

More particularly, I show a master cylinder 142 mounted on the tractor portion 134 operated by a brake pedal 144. As seen, the master cylinder is connected directly by way of conduit 146 to the conduit 148 that leads to the lines 150 and 152, feeding fluid directly to the wheel cylinders of the wheel brakes for wheels 138. In addition, the conduit 148 is provided with a T-fitting 154 that is connected with a conduit 156 leading to the control valve portion 158 of a power unit 160 having a motor chamber 162 and a slave cylinder 164. As with the power units of FIGURE 1, the motor cylinder 162 is divided by a movable wall into a control chamber and a pressure chamber with a conduit 166 connecting the control valve 158 with a control chamber of the motor chamber 162. The pressure chamber is communicated to a vacuum source such as an engine intake manifold 168 by a conduit 170 having a valve 172 to open or close the communication. In addition, a reservoir 173 is connected as by a conduit 174 to the slave cylinder 164. For a further explanation of the power units shown in FIGURES 1 and 2 the reader's attention is directed to Patent No. 3,031,851, issued May 1, 1962, showing the inner detail alluded to herein above. It is to be understood that the inner details mentioned do not form a part of this invention, except in that they are referred to in order to explain the working of my invention.

The slave cylinder 164 is connected by a conduit 176 to a quick disconnect 178 constructed in a similar fashion as the disconnect shown in FIGURE 1, and a conduit 180 leads from a quick disconnect to an actuator 182 having a piston 184 connected with a rod 186 that is adapted to operate a secondary master cylinder 188 from a closed trailer braking system. As seen, the master cylinder is connected by a conduit 190 to the fittings 192 and 194 that distribute fluid to the lines 196 and 198, respectively, connected to the braking units within the wheels 140.

Thus, it may be seen that as the operator pushes on the brake pedal 144, not only are the brakes to wheels 138 actuated but the power unit 160 is actuated to create a pressure in the actuator 182 that applies the master cylinder 188 to actuate the brakes in the wheels 140 of the trailer portion of the vehicle 132.

The aforementioned description of the two embodiments for which I have visualized my invention may take is offered not as a limitation of the contribution that I have devised, but rather in accordance with the applicable patent statutes requiring an operative description of my invention. Therefore, it is intended that the scope of my invention is to be solely obtained from the appended claims.

I claim:
1. A brake system for a tractor-trailer vehicle having hydraulic tractor brakes for a tractor portion and trailer brakes for a trailer portion, said brake system comprising:
   an operator controlled master cylinder;
   a first power brake device operatively connected to said master cylinder, which first power brake device is mounted on the tractor portion of the vehicle said first power brake device including a differential air pressure motor, a control valve for creating a pressure differential for operating said motor, and a slave cylinder operatively connected to said motor for supplying a fluid pressure to operate the hydraulic tractor brakes;
a first conduit communicating a power source to said first power brake device;
a second conduit connecting said slave cylinder of said first power brake device to said hydraulic tractor brakes;
a second power brake device mounted on said tractor including a differential pressure motor, a control valve, and a slave cylinder operatively connected to said motor to develop a hydraulic pressure;
a third conduit connecting said second power brake device to the power source, which third conduit includes a valve to open and close the communication of said power source with said motor;
a fourth conduit operatively connecting said control valve of said second power brake device with said second conduit to allow said slave cylinder of said first power brake device to control operation of said second power brake device;
a hand operated control valve operatively mounted in the tractor portion of the vehicle and operatively connected to said control valve of said second power brake device and to the third conduit, which hand valve is arranged to actuate said second power brake device regardless of actuation of said master cylinder and said first power brake device and to utilize said power source to release said second power brake device;
a hydraulic fluid reservoir operatively connected to said slave cylinder of said second power brake device replenishing said slave cylinder's fluid supply on release of said brakes;
a means to operatively connect said slave cylinder of said second power brake device to said trailer brakes including, a releasable coupling between the tractor and trailer portions, an automatic pressure producing device mounted on the trailer portion and arranged to activate said trailer brakes upon breakaway of said trailer from said tractor and a vertical reservoir on said trailer portion arranged so that entrapped air may be bled from said trailer brakes by allowing it to rise to the top of a fluid column where it is exhausted to surrounding atmosphere; and
releasable coupling means on the tractor portion, said means being operatively connected to said hand operated control valve to enable the tractor portion of the vehicle to be operative with a pneumatic trailer brake system and a hydraulic trailer brake system.

2. A brake system for a tractor-trailer vehicle having hydraulic tractor brakes that is operable with hydraulic trailer brakes and pneumatic trailer brakes, said brake system comprising:
an operator controlled master cylinder;
a first power brake unit operatively connected to said master cylinder, said first power brake unit being mounted on said tractor apparatus and including a differential air pressure motor, a control valve for creating a pressure differential for operating said motor, and a slave cylinder having a piston operatively connected to said motor;
a first means for communicating a power source to said first power brake unit;
a first conduit connecting said first power brake slave cylinder to said tractor hydraulic brakes;
a second power brake unit mounted on said tractor including a differential pressure motor, a control valve and a slave cylinder having a piston operatively connected to said motor;
a second means connecting said second power brake unit to the power source, which second means includes a valve to monitor the communication of said power source with said unit;
a means operatively connecting said second power brake control valve with said first conduit to allow said first brake slave cylinder to control operation of said second power brake unit;
a second conduit connected to said second power brake slave cylinder for supplying a hydraulic fluid from said second power brake slave cylinder;
a first releasable coupling means connected to said second conduit for communicating a hydraulic pressure to the trailer portion of the vehicle; and
a second releasable coupling means operatively connected to said second means and said second power brake unit for communicating a pneumatic pressure to the trailer portion of the vehicle.

3. A brake system for a tractor-trailer vehicle according to claim 2 and further comprising a hydraulic trailer brake system operatively connected to said first releasable coupling including,
an automatic pressure producing device within said hydraulic trailer brake system for activating said trailer brakes upon breakaway of said trailer from said tractor, and
a vertical reservoir within said hydraulic trailer brake system adapted to bleed said trailer brakes by allowing entrapped air to rise to the top of a fluid column where it may be removed.

References Cited by the Examiner

UNITED STATES PATENTS

| | | | |
|---|---|---|---|
| 2,463,172 | 3/1949 | Gunderson | 303—31 |
| 2,652,904 | 9/1953 | Whitten | 303—7 |
| 2,871,065 | 1/1959 | Blair et al. | 303—31 |
| 3,036,868 | 5/1962 | Parkhurst | 303—2 |
| 3,058,781 | 10/1962 | Stair | 303—2 |

FOREIGN PATENTS 785,635   9/1957   Great Britain.

A. HARRY LEVY, *Primary Examiner.*

EUGENE G. BOTZ, *Examiner.*